United States Patent
Trainin

(10) Patent No.: US 7,486,650 B2
(45) Date of Patent: Feb. 3, 2009

(54) METHOD, APPARATUS AND SYSTEM OF WIRELESS TRANSMISSION

(75) Inventor: Solomon B. Trainin, Haifa (IL)

(73) Assignee: Intel Corporation, Santa Clara, CA (US)

( * ) Notice: Subject to any disclaimer, the term of this patent is extended or adjusted under 35 U.S.C. 154(b) by 1040 days.

(21) Appl. No.: 10/949,199

(22) Filed: Sep. 27, 2004

(65) Prior Publication Data

US 2006/0072492 A1   Apr. 6, 2006

(51) Int. Cl.
*H04Q 7/24* (2006.01)
(52) U.S. Cl. .................................. 370/338; 370/445
(58) Field of Classification Search ............ None
See application file for complete search history.

(56) References Cited

U.S. PATENT DOCUMENTS

2002/0164963 A1* 11/2002 Tehrani et al. ............ 455/101
2004/0151146 A1* 8/2004 Hammerschmidt ......... 370/338
2005/0220131 A1* 10/2005 Ginzburg et al. .......... 370/432
2007/0223412 A1* 9/2007 Lott ...................... 370/310.1
2007/0263564 A1* 11/2007 Hansen et al. ............ 370/328
2008/0163024 A1* 7/2008 Lakkis ..................... 714/752

OTHER PUBLICATIONS

U.S. Appl. No. 10/608,127, filed Jun. 30, 2003, Ginzburg, Boris et al.
U.S. Appl. No. 10/734,120, filed Dec. 15, 2003, Ginzburg, Boris et al.

* cited by examiner

*Primary Examiner*—Ajit Patel
(74) *Attorney, Agent, or Firm*—Pearl Cohen Zedek Latzer, LLP

(57) ABSTRACT

Embodiments of the present invention provide a method, apparatus and system which may include transmitting a first packet over a first channel, which is wider than a second channel intended for receiving a second packet, wherein said first and second channels have substantially the same central frequency. Other embodiments are described and claimed.

44 Claims, 6 Drawing Sheets

METHOD, APPARATUS AND SYSTEM OF WIRELESS TRANSMISSION

BACKGROUND OF THE INVENTION

In wireless local area networks (WLAN), network stations may use a channel access mechanism and a control mechanism to protect transportation of packets over the network. An example of an access mechanism may be a Carrier Sense Multiple Access with Collision Avoidance (CSMA/CA) and, more specifically, CSMA/CA with a binary exponential back-off method. A Request To Send/Clear To Send (RTS/CTS) protection mechanism included in the CSMA/CA mechanism may be used to protect packet transportation.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
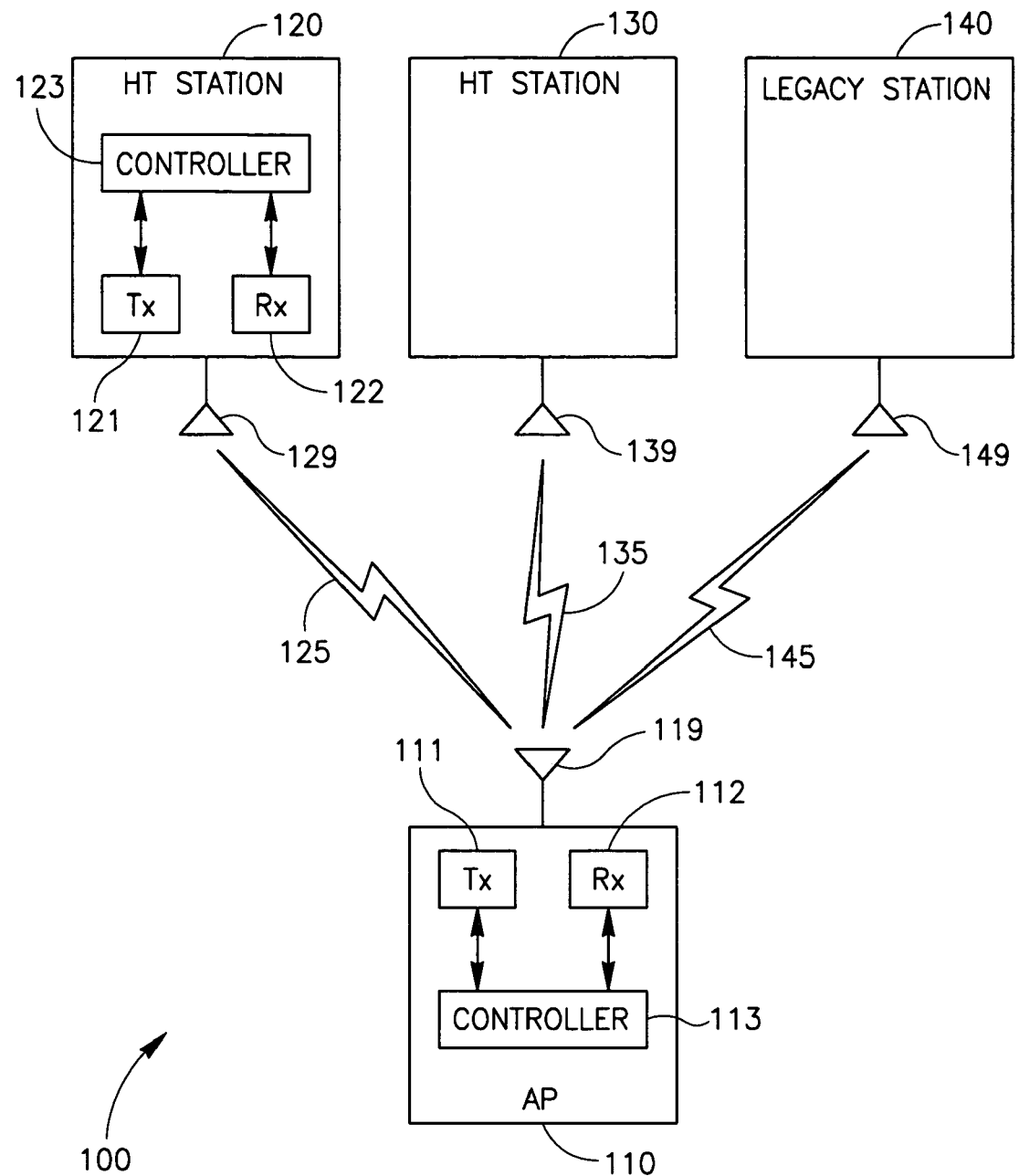
FIG. 1 is a schematic diagram of a wireless communication system including communication devices in accordance with some exemplary embodiments of the present invention.

It will be appreciated that for simplicity and clarity of illustration, elements shown in the drawings have not necessarily been drawn accurately or to scale. For example, the dimensions of some of the elements may be exaggerated relative to other elements for clarity or several physical components included in one functional block or element. Further, where considered appropriate, reference numerals may be repeated among the drawings to indicate corresponding or analogous elements. Moreover, some of the blocks depicted in the drawings may be combined into a single function.

DETAILED DESCRIPTION OF EMBODIMENTS OF THE INVENTION

In the following detailed description, numerous specific details are set forth in order to provide a thorough understanding of the invention. However, it will be understood by those of ordinary skill in the art that the present invention may be practiced without these specific details. In other instances, well-known methods, procedures, components and circuits may not have been described in detail so as not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

Embodiments of the present invention may include an apparatus for performing the operations herein. This apparatus may be specially constructed for the desired purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), magnetic or optical cards, a Dynamic RAM (DRAM), a Synchronous DRAM (SD-RAM), a Flash memory, a volatile memory, a non-volatile memory, a cache memory, a buffer, a short term memory unit, a long term memory unit, or any other type of media suitable for storing electronic instructions, and capable of being coupled to a computer system bus.

Part of the discussion herein may relate, for exemplary purposes, to transmitting a packet, e.g., a data packet. However, embodiments of the invention are not limited in this regard, and may include, for example, transmitting a signal, a block, a data portion, a data sequence, a frame, a data signal, a preamble, a signal field, a content, an item, a message, or the like.

It should be understood that the present invention may be used in a variety of applications. Although the present invention is not limited in this respect, the circuits and techniques disclosed herein may be used in many apparatuses such as units of a wireless communication system, for example, a Wireless Local Area Network (WLAN) communication system and/or in any other unit and/or device. Units of a WLAN communication system intended to be included within the scope of the present invention include, by way of example only, modems, Mobile Units (MU), Access Points (AP), wireless transmitters/receivers, and the like.

Types of WLAN communication systems intended to be within the scope of the present invention include, although are not limited to, WLAN communication systems as described by "IEEE-Std 802.11, 1999 Edition (ISO/IEC 8802-11: 1999)" standard ("the 802.11 standard"), and more particularly in "IEEE-Std 802.11b-1999 Supplement to 802.11-1999, Wireless LAN MAC and PHY specifications: Higher speed Physical Layer (PHY) extension in the 2.4 GHz band" ("the 802.11b standard" ), and "IEEE-Std 802.11n—High throughput extension to the 802.11 ("the 802.11n standard" ), and the like.

Although the scope of the present invention is not limited in this respect, the circuits and techniques disclosed herein may also be used in units of wireless communication systems, digital communication systems, satellite communication systems and the like.

Devices, systems and methods incorporating aspects of embodiments of the invention are also suitable for computer communication network applications, for example, intranet and Internet applications. Embodiments of the invention may be implemented in conjunction with hardware and/or software adapted to interact with a computer communication network, for example, a LAN, wide area network (WAN), or a global communication network, for example, the Internet.

Reference is made to FIG. 1, which schematically illustrates a wireless communication system 100 in accordance with an embodiment of the present invention.

In some exemplary embodiments of the invention, communication system 100 may include a WLAN system. Although the scope of the present invention is not limited in this respect, communication system 100 may be defined, e.g., by the 802.11 standard, as a Basic Service Set (BSS). For example, the BSS may include at least one communication station, for example, an AP 110, and stations 120, 130, and 140 at least one of which may be a MU. In some embodiments, stations 140, 130 and 120 may be able to transmit and/or receive one or more packets over wireless communication system 100. The packets may include data, control messages, network information, and the like. Additionally or alternatively, in other embodiments of the present invention, wireless communication system 100 may be implemented, for example, to interconnect one or more BSSs and one or more integrated local area networks (LANs), e.g., to create an extended service set (ESS), as defined by the 802.11 standard, although the scope of the present invention is not limited in this respect.

According to exemplary embodiments of the invention, AP 110 may include one or more antennas 119 for transmitting and/or receiving packets, e.g., to/from stations 120, 130 and/or 140. Stations 120, 130 and/or 140 may include one or more antennas 129, 139 and/or 149, respectively, for transmitting and/or receiving packets, e.g., to/from AP 110. Although the scope of the present invention is not limited in this respect, types of antennae that may be used for antennas 119, 129, 139, and/or 149 may include but are not limited to internal antenna, dipole antenna, omni-directional antenna, a monopole antenna, an end fed antenna, a circularly polarized antenna, a micro-strip antenna, a diversity antenna and the like.

According to some exemplary embodiments of the invention, system 100 may include a "mixed client system". For example, one or more stations of system 100, e.g., station 140, may include a legacy communication device, e.g., a communication device able to transmit and/or receive packets over a first channel having a Central Frequency (CF) and a first channel width. One or more stations of system 100, e.g., stations 120 and/or 130, may include a High-Throughput (HT) communication device able, for example, to transmit and/or receive packets over a second channel, e.g., having the substantially same CF as the first channel and a second channel width bigger than the first channel width, as described below.

According to exemplary embodiments of the invention, AP 110 may include suitable WLAN AP communication circuitry, for example, AP circuitry able to operate in accordance with the 802.11n standard and/or any other suitable standard.

According to some exemplary embodiments of the invention, it may be desired to implement a protection mechanism, e.g., for preventing collisions between packets transmitted by one or more of stations 110, 120, 130 and/or 140. For example, AP 110 may be able to control communication between AP 110 and stations 120, 130 and/or 140 by sending control commands of a packet protection mechanism, e.g., via beacons 125, 135, 145. For example, AP 110 may implement a Carrier Sense, Multiple Access/Collision Avoidance (CSMA/CA) mechanism, which may include a Request-To-Send/Clear-To-Send (RTS/CTS) mechanism, which may be used to provide collision protection to the transmission of a data frame, as described below.

According to exemplary embodiments of the invention, stations 110, 120, 130 and/or 140 may operate in a stand-by mode during which a stand-by channel may be monitored, for example, for receiving one or more protection packets, e.g., RTS and/or CTS packets, as described below.

Figure 2:
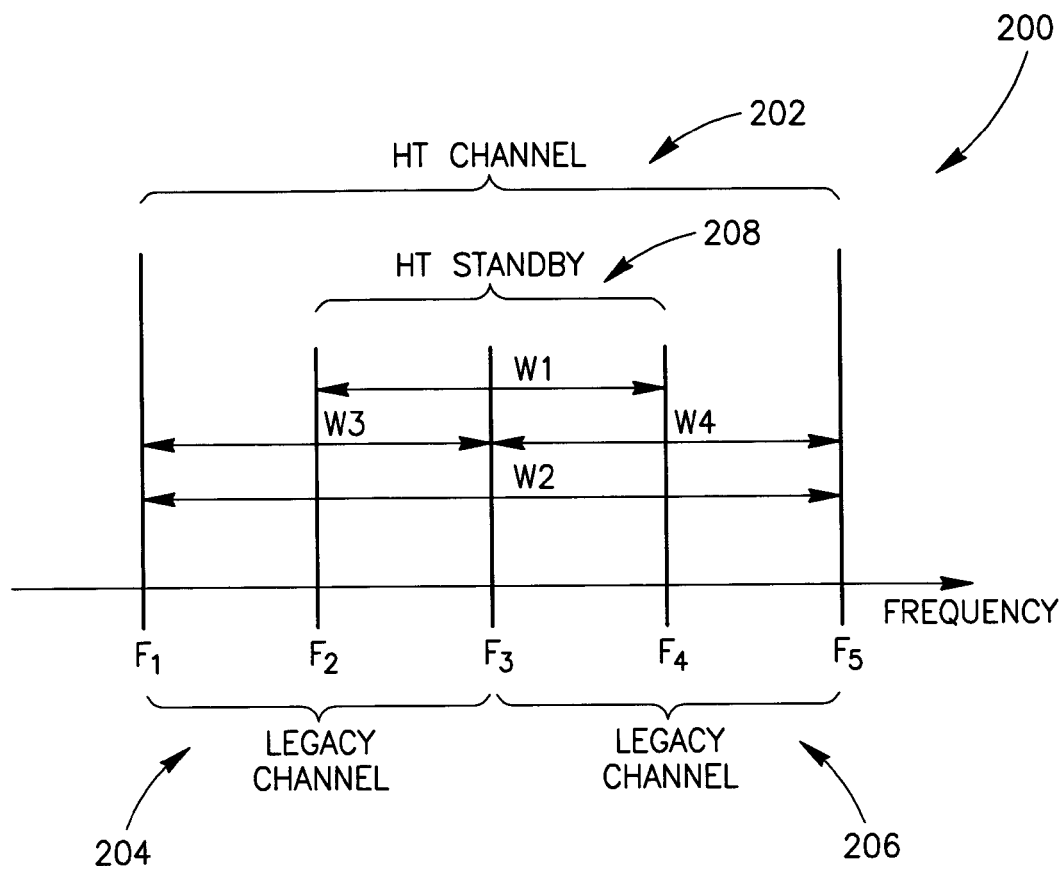
FIG. 2 is a schematic illustration of a frequency-partitioning scheme that may be used by communication devices, systems and methods in accordance with some exemplary embodiments of the invention.

Reference is also made to FIG. 2, which schematically illustrates a frequency-partitioning scheme 200 in accordance with some exemplary embodiments of the invention. Although the invention is not limited in this respect, system 100 may implement frequency-partitioning scheme 200, e.g., for communication between stations 110, 120, 130 and/or 140, e.g., as described below.

According to some exemplary embodiments of the invention, frequency-partitioning scheme 200 may include a HT channel 202, which may extend between a first frequency, denoted $F_1$, and a second frequency, denoted $F_5$, and may have a CF, denoted $F_3$. Scheme 200 may also include a first legacy channel 204, which may extend between frequencies $F_1$ and $F_3$ and may have a CF denoted $F_2$; and a second legacy channel 206, which may extend between frequencies $F_3$ and $F_5$ and may have a CF denoted $F_4$. Scheme 200 may additionally include a HT stand-by channel 208, which may extend between frequencies $F_2$ and $F_4$ and may have substantially the same CF as HT channel 202. For example, HT standby channel 208 may have a width $W_1$; legacy channel 204 may have a width $W_3$; legacy channel 206 may have a width $W_4$, e.g., $W_4 = W_3$; and HT channel 202 may have a width $W_2$, e.g., $W_2 = W_3 + W_4$. For example, HT channel 202 may extend between frequencies 5190 Mega Hertz (MHz) and 5230 MHz, and may have a CF of 5210 MHz; legacy channel 204 may extend between frequencies 5190 MHz and 5210 MHz, and may have a CF of 5200 MHz; legacy channel 206 may extend between frequencies 5210 MHz and 5230 MHz, and may have a CF of 5220 MHz; and HT stand-by channel 208 may extend between frequencies 5200 MHz and 5220 MHz, and may have a CF of 5210 MHz.

Referring back to FIG. 1, although the invention is not limited in this respect, one or more legacy stations of system 100, e.g., station 140, may be able to transmit and/or receive packets over legacy channel 204 and/or legacy channel 206; and/or monitor legacy channel 204 and/or legacy channel 206, e.g., during a stand-by mode of operation.

According to exemplary embodiments of the invention, one or more HT stations of system 100, e.g., station 120, may include a transmitter (Tx) 121 able to selectively transmit one or more packets over either HT channel 202 or a combined channel having a width equal to the width of HT channel 202 and including two sub-channels, e.g., channels 204 and 206, as described below. For example, transmitter 121 may include a transmitter as described in U.S. patent application Ser. No. 10/608,127, filed Jun. 30, 2003, entitled "Method and Apparatus for Multi-Channel Wireless LAN Architecture", and assigned to the assignee of the this application. Station 120 may also include a receiver (Rx) 122 able to receive one or more packets over HT channel 202.

It will be appreciated by those skilled in the art that the energy or power, required for monitoring a channel, e.g., during a stand-by mode of operation, may be related to the width of the channel. For example, the energy required for monitoring channel 202 may be higher than the energy required for monitoring channels 204, 206, or 208. According to some exemplary embodiments of the invention, receiver 122 may be able to monitor HT stand-by channel 208, e.g., during the stand-by mode of operation.

Thus, according to some exemplary embodiments of the invention, it may be desired to implement a protection mechanism using channel 208 to transmit/receive to/from one or more of the HT stations of system 100 one or more protection packets, e.g., as described below. Station 120 may also include a controller 123 able to control transmission of a first packet, e.g., a data packet, over a first channel, e.g., HT channel 202, having substantially the same central frequency as a second channel, e.g., channel 208, intended for receiving a second packet, e.g., a protection packet, wherein a width of the first channel is larger than a width of the second channel, as described below.

According to some exemplary embodiments of the invention, AP 110 may include a transmitter 111 able to selectively transmit one or more packets over HT channel 202, legacy channels 204 and/or 206, HT stand-by channel 208, or the combined channel including channels 204 and 206. AP 110 may also include a receiver 112 able to receive one or more packets over HT channel 202, legacy channels 204 and/or 206, HT stand-by channel 208, and/or the combined channel including channels 204 and 206. AP 110 may also include a controller 113 to implement a protection mechanism for protecting a packet intended for transmission by AP 110 and/or to implement a protection mechanism for protecting a packet to be received by station 110, e.g., as described below. For example, controller 113 may selectively control transmission of a packet over HT channel 202, legacy channels 204 and/or 206, HT stand-by channel 208, and/or the combined channel including channels 204 and 206, e.g., as described below.

According to some exemplary embodiments of the invention, one or more communication devices of system 100, e.g., HT stations 120 and/or 130, and/or AP 110, may be able to transmit an extended RTS (xRTS) packet, e.g., as part of a protection mechanism for protecting a packet, e.g., as described below.

Figure 3:
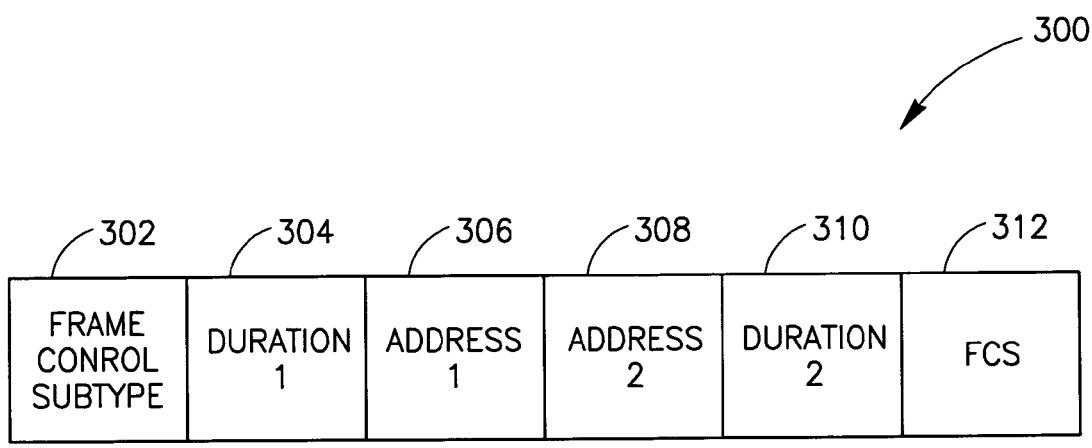
FIG. 3 is a schematic illustration of an extended request-to-send packet in accordance with some exemplary embodiments of the invention.

Reference is now made to FIG. 3, which schematically illustrates an xRTS packet 300 in accordance with some exemplary embodiments of the invention.

According to some exemplary embodiments of the invention, xRTS packet 300 may be transmitted as part of a protection mechanism for protecting a packet, e.g., a data packet. Packet 300 may include a first duration field 304, e.g., including two bit octets, and a second duration field 310, e.g., including two bit octets. Duration field 304 may have a value corresponding to, for example, a virtual Network Allocation Vector (NAV) intended for use by other stations, e.g., HT stations and/or legacy stations; and duration field 310 may have a value corresponding to, for example, a NAV corresponding to a transmission time of the packet, as described below.

According to some exemplary embodiments of the invention, xRTS packet 300 may also include a frame control subtype field 302, e.g., including two bit octets, having a value indicative of a type of packet 300. For example, field 302 may have a value indicating packet 300 is an xRTS packet. Packet 300 may further include first and second address fields 306 and 308, respectively, and a Frame Check Sequence (FCS) field, as are known in the art.

Figure 4:
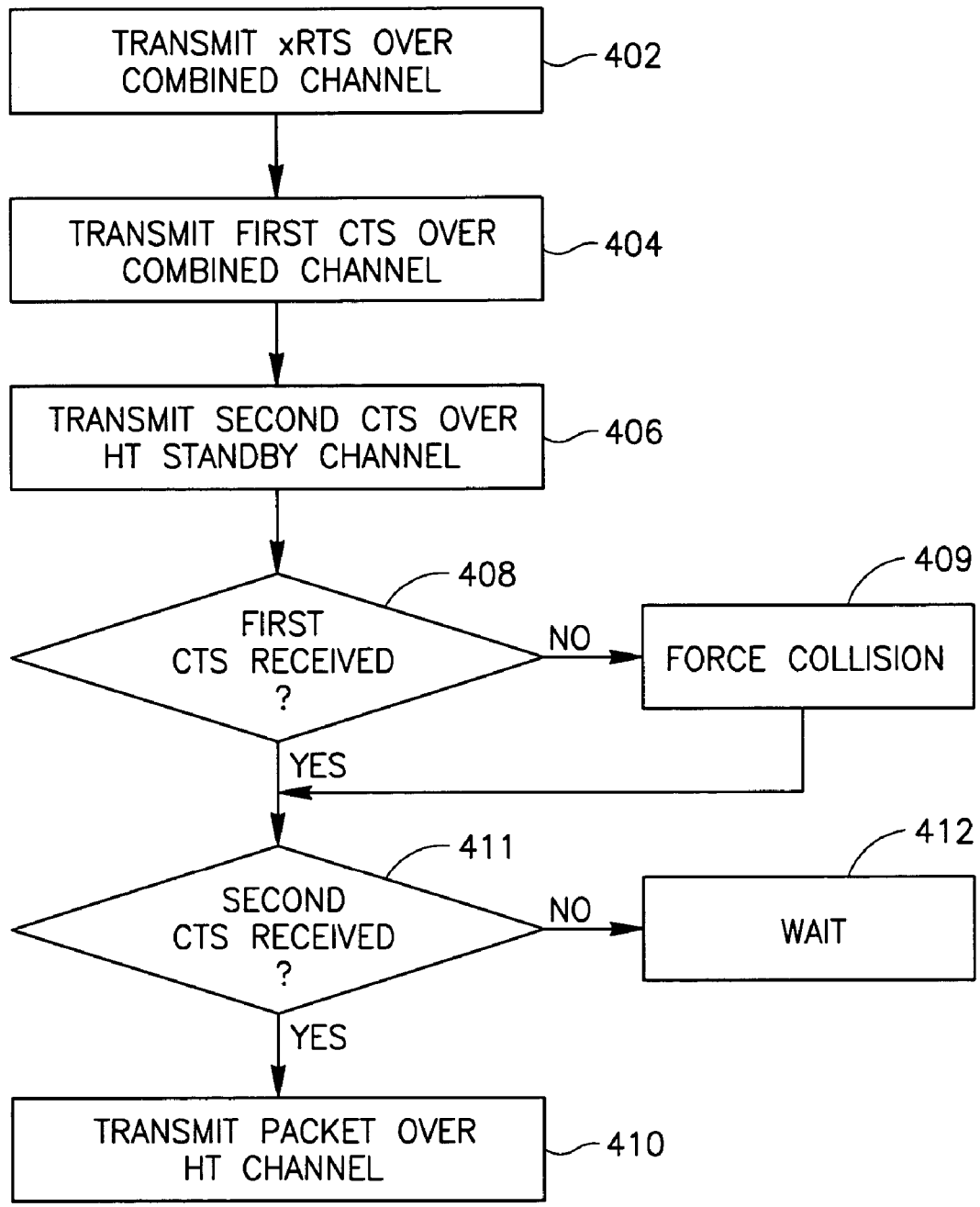
FIG. 4 is a schematic illustration of a method for protecting transmission of a packet, in accordance with an exemplary embodiment of the invention.
Figure 5:
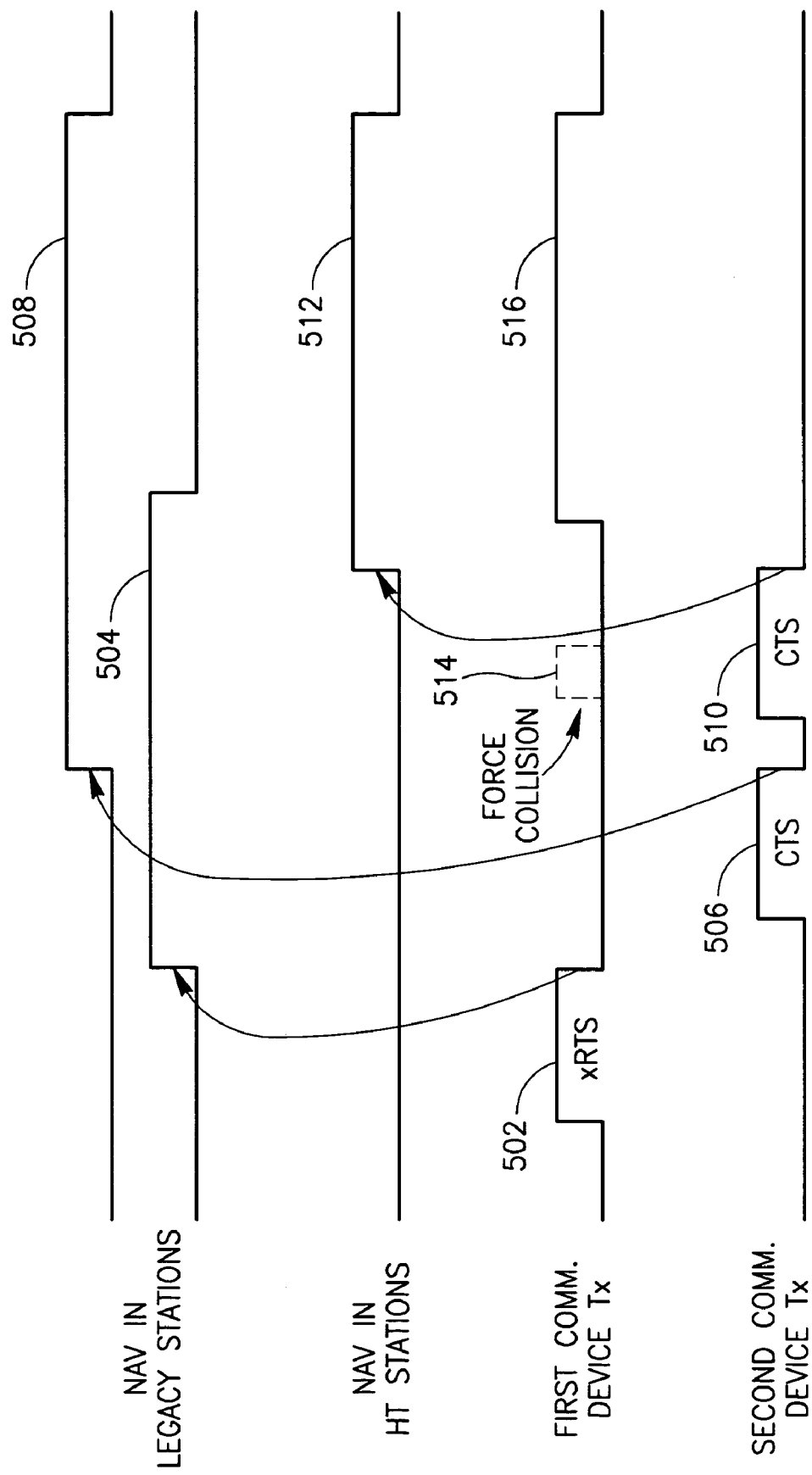
FIG. 5 is a sequence of schematic timing diagrams corresponding to various stages in the method of FIG. 4.

Reference is now made to FIG. 4, which schematically illustrates a method for protecting transmission of a packet, e.g., a data packet, from a first communication device, e.g., a HT station, to a second communication device, e.g., an AP, according to an exemplary embodiment of the invention. Reference is also made to FIG. 5, which illustrates a sequence of schematic timing diagrams corresponding to various stages in the method of FIG. 4. Although the invention is not limited in this respect, the method of FIGS. 4 and 5 may be implemented for protecting transmission of a packet from HT station 120 (FIG. 1), to AP 110 (FIG. 1).

According to some exemplary embodiments of the invention, the method may include transmitting a first packet, e.g., a data packet and/or an xRTS packet, over a first channel, e.g., the HT channel, having substantially the same central frequency as a second channel, e.g., the HT standby channel, for receiving a second packet, for example, a protection packet, e.g., an xRTS packet and/or a CTS packet, as described below.

As indicated at block 402, the method may include transmitting, e.g., during a time period 502, an xRTS packet, e.g., as described above with reference to FIG. 3, over a combined channel including two adjacent legacy channels, e.g., channels 204 and 206 (FIG. 2). The first duration field of the xRTS packet may include a value corresponding to a time period 504 at least partially overlapping a time period 516 for transmitting the data packet, as described below. The second duration field of the xRTS packet may include a value corresponding to time period 516.

According to exemplary embodiments of the invention, one or more legacy stations, e.g., station 140 (FIG. 1), may receive the xRTS packet. It will be appreciated that a station, e.g., a legacy station, receiving an unrecognized packet, e.g., the xRTS packet, is required to assert a NAV for a time period corresponding to the duration field of the unrecognized packet, e.g., as defined by the 802.11 standard. Accordingly, the one or more legacy stations receiving the xRTS packet may assert a NAV for time period 504 corresponding to the value of the first duration field of the xRTS packet.

As indicated at block 404, the method may also include transmitting a first CTS packet over the combined channel, e.g., in response to receiving the xRTS packet. For example, an AP, e.g., AP 110 (FIG. 1), receiving the xRTS packet may transmit over the combined channel, including channels 204 and 206 (FIG. 2), a CTS packet including a duration field corresponding to a time period 508 including substantially the entirety of time period 516, e.g., as described below.

According to exemplary embodiments of the invention, one or more legacy stations, e.g., station 140 (FIG. 1), may receive the first CTS packet and assert a NAV for time period 508.

As indicated at block 406, the method may also include transmitting a second CTS packet over a HT standby channel. For example, AP 110 (FIG. 1) may transmit over HT standby channel 208 (FIG. 2) a CTS packet including a duration field corresponding to a time period 512 including substantially the entirety of time period 516, e.g., as described below.

According to exemplary embodiments of the invention, one or more HT stations, e.g., station 130 (FIG. 1), monitoring the HT standby channel, may receive the second CTS packet and, in response, assert a NAV for time period 512.

As indicated at block 408, the method may include determining whether or not the first CTS packet has been received. For example, the first communication device, e.g., station 120 (FIG. 1), may determine not to transmit the data packet, e.g., if the first CTS packet was not received by station 120 (FIG. 1). In such a case, it may be desired to reduce the NAV time period asserted by the other HT stations. For example, it may be desired to prevent the other HT stations from receiving the second CTS packet, e.g., such that the other HT stations may assert the NAV for only time period 504.

Thus, as indicated at block 409, the method may include according to some exemplary embodiments of the invention, forcing a collision of the second CTS packet, e.g., selectively, for example, by transmitting a collision packet during a time period 514 at least partially overlapping time period 510. For example, station 120 (FIG. 1) may transmit the collision packet during time period 514, e.g., if the first CTS was not received by station 120 and/or if station 120 determines not to transmit the data packet for any other reason. Additionally or alternatively, the first communication device, e.g., station 120 (FIG. 1), may deny transmission of the data packet, e.g., if the second CTS packet is not received.

As indicated at block 411, the method may also include determining whether the second CTS packet has been received.

As indicated at block 412, the method may also include waiting a time period, e.g., a back-off time period, for example, if the first communication device has not received the second CTS packet. For example, station 120 (FIG. 1) may re-transmit the xRTS packet, for example, after the back-off time period, e.g., as described above.

As indicated at block 410, the method may include transmitting, e.g., during time period 516, the data packet over a HT channel, e.g., channel 202 (FIG. 2). For example, the first communication device, e.g., station 120 (FIG. 1), may transmit the data packet to the second communication device, e.g., AP 110 (FIG. 1).

As described above, in response to receiving the xRTS packet, the one or more legacy stations may assert a NAV during time period 504, which may include at least the beginning of time period 516. Thus, the transmission of the data packet may be protected from the one or more legacy stations, e.g., station 140 (FIG. 1), even if one or more of the legacy stations do not receive the first CTS packet.

According to some exemplary embodiments of the invention, the first communication device, e.g., station 120 (FIG. 1), may be able to transmit the xRTS packet, e.g., over the combined channel; to monitor the combined channel, e.g., for the first CTS packet; to monitor the HT standby channel, e.g., for the second CTS packet; and to transmit the data packet, e.g., over the HT channel. For example, controller 123 (FIG. 1) may control receiver 122 (FIG. 1) to selectively switch between the combined channel and the HT standby channel, and/or may control transmitter 121 (FIG. 1) to selectively switch between the combined channel and the HT channel.

According to some exemplary embodiments of the invention, the second communication device, e.g., AP 110 (FIG. 1), may be able to receive the xRTS packet, e.g., over the combined channel; to transmit the first CTS packet, e.g., over the combined channel; to transmit the second CTS packet, e.g., over the HT standby channel; and to receive the data packet, e.g., over the HT channel. For example, controller 113 (FIG. 1) may control receiver 112 (FIG. 1) to selectively switch between the combined channel and the HT channel, and/or may control transmitter 111 (FIG. 1) to selectively switch between the combined channel and the HT standby channel.

According to the above description, the value of the first duration field of the xRTS packet transmitted by the first communication device may correspond to the sum of at least time periods 506 and 510, and three Short Inter-Frame Space (SIFS) time periods. The value of the duration field of the first CTS packet may correspond to the sum of at least time periods 510 and 516, and two SIFS time periods. The value of the duration field of the second CTS packet may correspond to the sum of at least time period 516, and one SIFS time period.

Figure 6:
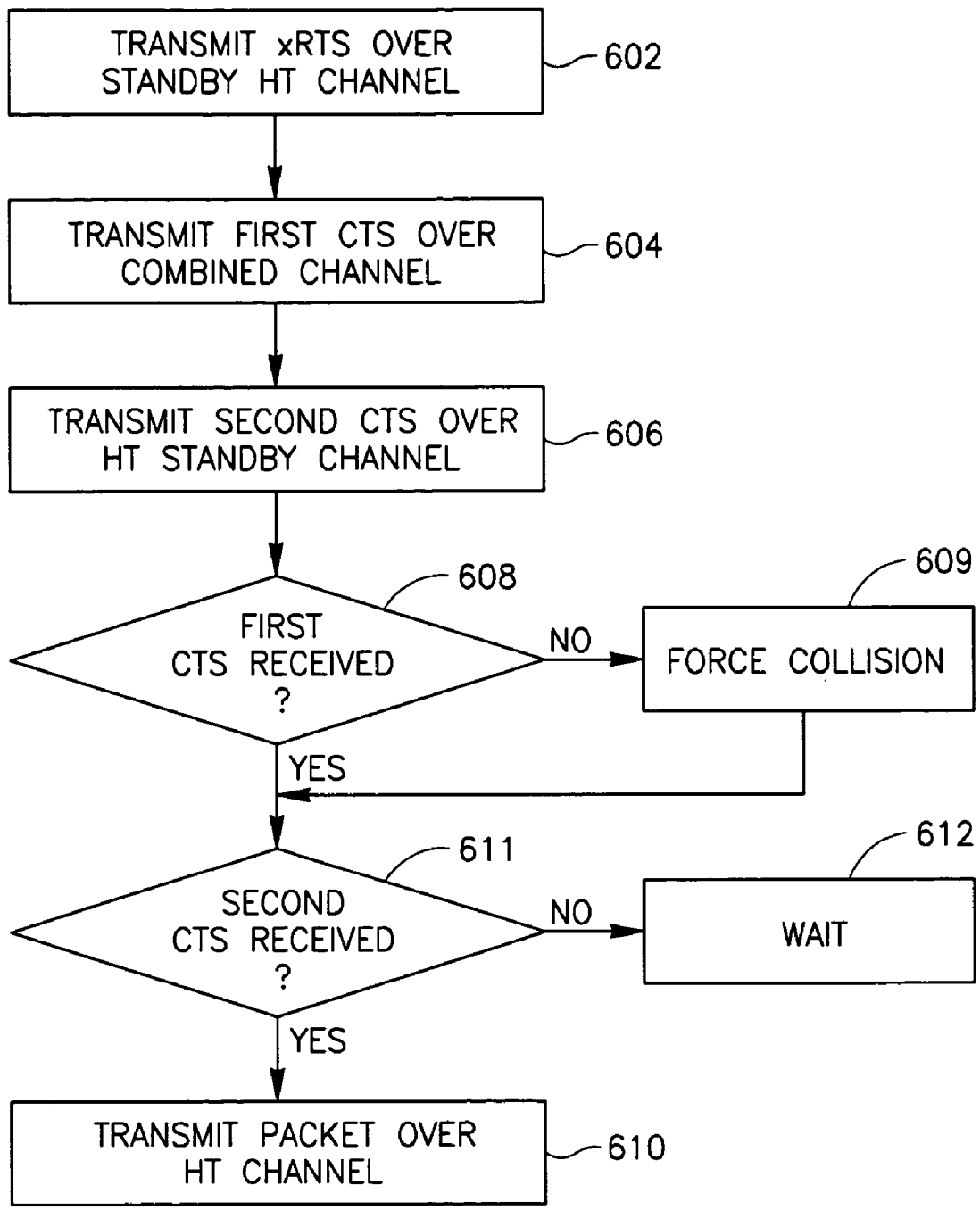
FIG. 6 is a schematic illustration of a method for protecting transmission of a packet, in accordance with another exemplary embodiment of the invention.
Figure 7:
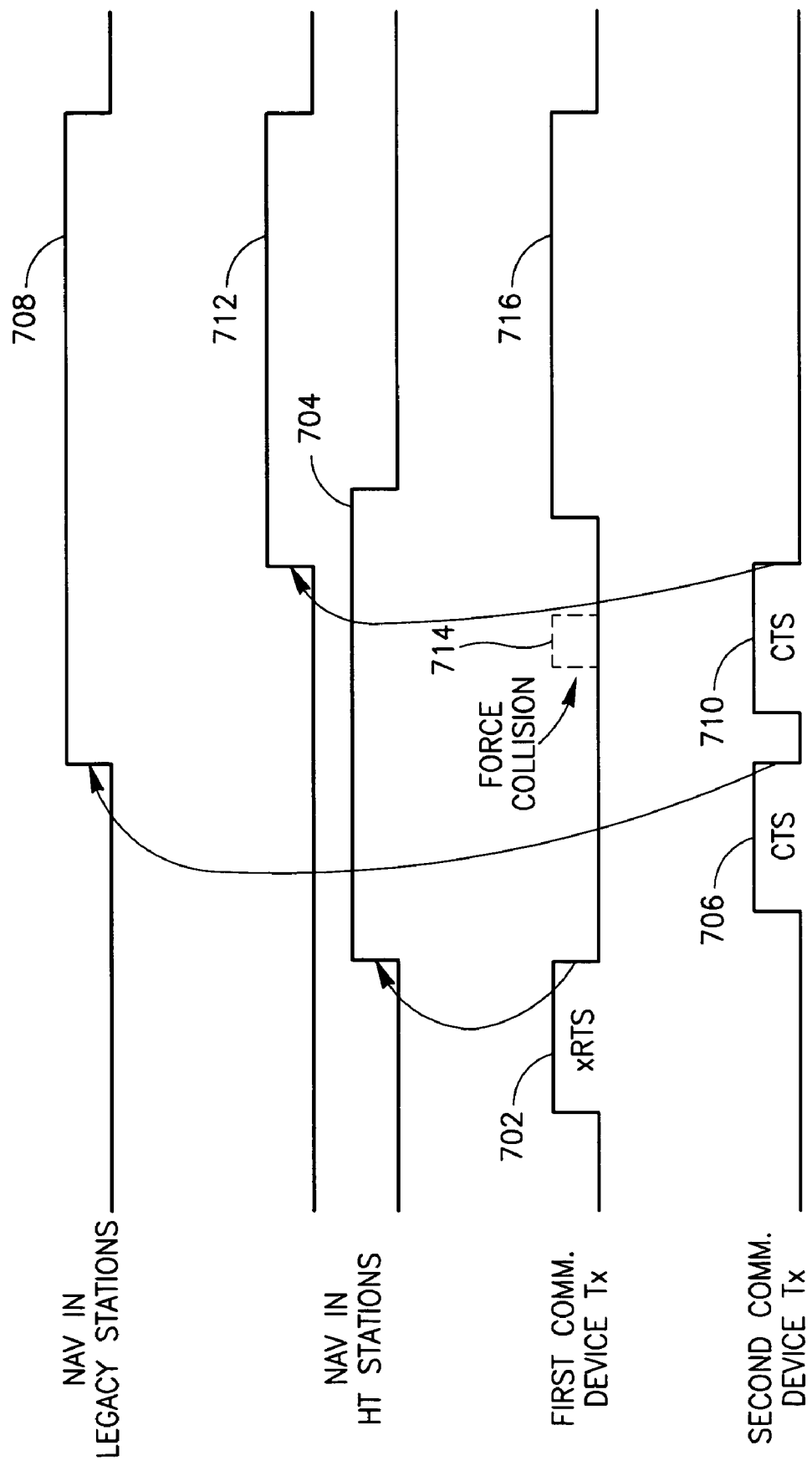
FIG. 7 is a sequence of schematic timing diagrams corresponding to various stages in the method of FIG. 6.

Reference is now made to FIG. 6, which schematically illustrates a method for protecting transmission of a packet, e.g., a data packet, from a first communication device, e.g., an AP, to a second communication device, e.g., a HT station, in accordance with another exemplary embodiment of the invention. Reference is also made to FIG. 7, which illustrates a sequence of schematic timing diagrams corresponding to various stages in the method of FIG. 6. Although the invention is not limited in this respect, the method of FIGS. 6 and 7 may be implemented for protecting transmission of a packet from AP 110 (FIG. 1) to HT station 120 (FIG. 1).

According to some exemplary embodiments of the invention, the method may include transmitting a first packet, e.g., a data packet, over a first channel, e.g., the HT channel, having substantially the same central frequency as a second channel, e.g., the HT standby channel, for receiving a second packet, for example, a protection packet, e.g., a CTS packet, as described below.

As indicated at block 602, the method may include transmitting, e.g., during a time period 702, an xRTS packet, e.g., as described above with reference to FIG. 3, over a HT standby channel, e.g., channel 208 (FIG. 2). The first duration field of the xRTS packet may include a value corresponding to a time period 704 at least partially overlapping a time period 716 for transmitting the data packet, as described below. The second duration field of the xRTS packet may include a value corresponding to time period 716. An address field of the xRTS packet may include an address of the second communication device, e.g., HT station 120 (FIG. 1), intended to receive the data packet.

According to exemplary embodiments of the invention, one or more HT stations, e.g., stations 120 and/or 130 (FIG. 1), may receive the xRTS packet. One or more of the HT stations, e.g., station 130 (FIG. 1), not intended to receive the data packet may assert a NAV for time period 704 corresponding to the value of the first duration field of the xRTS packet.

As indicated at block 604, the method may also include transmitting a first CTS packet over a combined channel including two legacy channels, e.g., channels 204 and 206 (FIG. 2). For example, the station intended to receive the data packet, e.g. station 120 (FIG. 1), may transmit over the combined channel a first CTS packet including a duration field corresponding to a time period 708 including substantially the entirety of time period 716.

According to exemplary embodiments of the invention, one or more legacy stations, e.g., station 140 (FIG. 1), may receive the first CTS packet and assert a NAV for time period 708.

As indicated at block 606, the method may also include transmitting a second CTS packet over a HT standby channel. For example, HT 120 (FIG. 1) may transmit over HT standby channel 208 a second CTS packet including a duration field corresponding to a time period 712 including substantially the entirety of time period 716.

According to exemplary embodiments of the invention, one or more of the other HT stations, e.g., station 130, monitoring the HT standby channel, may receive the second CTS packet and, in response, assert a NAV for time period 712.

As indicated at block 608, the method may include determining whether or not the first CTS packet has been received. For example, the first communication device, e.g., AP 110 (FIG. 1), may determine not to transmit the desired packet if the first CTS was not received by the first communication device. In such a case, it may be desired to reduce the NAV time period asserted by the other HT stations. For example, it may be desired to prevent the other HT stations from receiving the second CTS packet, e.g., such that the other HT stations may assert the NAV for only time period 704.

Thus, as indicated at block 609, according to some exemplary embodiments of the invention, the method may include forcing a collision of the second CTS packet, e.g., selectively, for example, by transmitting a collision packet during a time period 714 at least partially overlapping time period 710. For example, AP 110 (FIG. 1) may transmit the collision packet during time period 714, e.g., if the first CTS was not received by AP 110, and/or if AP 110 determines not to transmit the data packet for any other reason. Additionally or alternatively, the first communication device, e.g., AP 110 (FIG. 1), may deny transmission of the data packet, e.g., if the second CTS packet is not received.

As indicated at block 611, the method may also include determining whether the second CTS packet has been received.

As indicated at block 612, the method may also include waiting a time period, e.g., a back-off time period, for example, if the first communication device has not received the second CTS packet. For example, AP 110 (FIG. 1) may re-transmit the xRTS packet, for example, after the back-off time period, e.g., as described above.

As indicated at block 610, the method may also include transmitting, e.g., during time period 716, the data packet over a HT channel, e.g., channel 202 (FIG. 2). For example, the first communication device, e.g., AP 110 (FIG. 1), may transmit the data packet to the second communication device, e.g., station 120 (FIG. 1).

According to the above description, the value of the first duration field of the xRTS packet transmitted by the first communication device may correspond to the sum of at least time periods 706 and 710, and three SIFS time periods. The value of the duration field of the first CTS packet may correspond to the sum of at least time periods 710 and 716, and two SIFS time periods. The value of the duration field of the second CTS packet may correspond to the sum of at least time period 716 and one SIFS time period.

As described above, in response to receiving the xRTS packet, the one or more HT stations may assert a NAV during time period 704, which may include at least the beginning of time period 716. Thus, the transmission of the data packet may be protected from the one or more other HT stations, e.g., station 130 (FIG. 1), even if one or more of the other HT stations do not receive the second CTS packet.

According to some exemplary embodiments of the invention, the first communication device, e.g., AP 110 (FIG. 1), may be able to transmit the xRTS packet, e.g., over the HT standby channel; to monitor the combined channel, e.g., for the first CTS packet; to monitor the HT standby channel, e.g., for the second CTS packet; and to transmit the data packet, e.g., over the HT channel. For example, controller 113 (FIG. 1) may control receiver 112 (FIG. 1) to selectively switch between the combined channel and the HT standby channel, and/or may control transmitter 111 (FIG. 1) to selectively switch between the HT standby channel and the HT channel.

According to some exemplary embodiments of the invention, the second communication device, e.g., station 120 (FIG. 1), may be able to receive the xRTS packet, e.g., over the Ht standby channel; to transmit the first CTS packet, e.g., over the combined channel; transmit the second CTS packet, e.g., over the HT standby channel; and to receive the certain packet, e.g., over the HT channel. For example, controller 123 (FIG. 1) may control receiver 122 (FIG. 1) to selectively switch between the HT standby channel and the HT channel, and/or may control transmitter 111 (FIG. 1) to selectively switch between the combined channel and the HT standby channel.

Embodiments of the present invention may be implemented by software, hardware, or by any combination of software and/or hardware as may be suitable for specific applications or in accordance with specific design requirements. Embodiments of the present invention may include units and sub-units, which may be separate of each other or combined together, in whole or in part, and may be implemented using specific, multi-purpose or general processors, or devices as are known in the art. Some embodiments of the present invention may include buffers, registers, storage units and/or memory units, for temporary or long-term storage of data and/or in order to facilitate the operation of a specific embodiment.

While certain features of the invention have been illustrated and described herein, many modifications, substitutions, changes, and equivalents may occur to those of ordinary skill in the art. It is, therefore, to be understood that the appended claims are intended to cover all such modifications and changes as fall within the true spirit of the invention.

What is claimed is:

1. A method comprising:
transmitting a first packet over a first channel, which is wider than a second channel, for receiving a second packet, wherein said first and second channels have substantially the same central frequency, wherein the method further comprising transmitting an extended request-to-send packet over a combined channel having at least two sub-channels, wherein a width of said combined channel is substantially equal to the width of said first channel.

2. The method of claim 1, wherein transmitting said extended request-to-send packet comprises transmitting said extended request-to-send packet comprising first and second duration fields.

3. The method of claim 2, wherein transmitting said extended request-to-send packet comprises transmitting said extended request-to-send packet comprising said first duration field corresponding to a first time period at least partially overlapping a second time period for transmitting said first packet.

4. The method of claim 3, wherein transmitting said extended request-to-send packet comprises transmitting said extended request-to-send packet comprising said first duration field corresponding to the sum of at least a third time period for transmitting a first clear-to send packet over said combined channel, and a fourth time period for transmitting a second clear-to-send packet over said second channel.

5. The method of claim 2, wherein transmitting said extended request-to-send packet comprises transmitting said extended request-to-send packet comprising said second duration field corresponding to a time period for transmitting said first packet.

6. The method of claim 1 comprising transmitting a clear-to-send packet over said combined channel in response to said extended request-to-send packet.

7. The method of claim 1 comprising transmitting a clear-to-send packet over said second channel in response to said extended request-to-send packet.

8. The method of claim 7 comprising forcing a collision of said clear-to-send packet.

9. The method of claim 1, comprising transmitting an extended request-to-send packet over said second channel.

10. The method of claim 9, wherein transmitting said extended request-to-send packet comprises transmitting said extended request-to-send packet comprising first and second duration fields.

11. The method of claim 10, wherein transmitting said extended request-to-send packet comprises transmitting said extended request-to-send packet comprising said first duration field corresponding to a first time period at least partially overlapping a second time period for transmitting said first packet.

12. The method of claim 11, wherein transmitting said extended request-to-send packet comprises transmitting said extended request-to-send packet comprising said first duration field corresponding to the sum of at least a third time period for transmitting a first clear-to send packet over a combined channel having a width equal to the width of said first channel and comprising two sub-channels, and a fourth time period for transmitting a second clear-to-send packet over said second channel.

13. The method of claim 10, wherein transmitting said extended request-to-send packet comprises transmitting said extended request-to-send packet comprising said second duration field corresponding to a time period for transmitting said first packet.

14. The method of claim 9 comprising transmitting in response to said extended request-to-send packet a clear-to-send packet over a combined channel having at least two sub-channels, wherein a width of said combined channel is substantially equal to the width of said first channel.

15. The method of claim 9 comprising transmitting a clear-to-send packet over said second channel in response to said extended request-to-send packet.

16. The method of claim 15 comprising forcing a collision of said clear-to-send packet.

17. The method of claim 1, wherein transmitting said first packet comprises transmitting a data packet over said first channel.

18. The method of claim 1 comprising receiving a protection packet over said second channel.

19. An apparatus comprising:
a controller able to control transmission of a first packet over a first channel, which is wider than a second channel for receiving a second packet, wherein said first and second channels have substantially the same central frequency, wherein said controller is able to control transmission of an extended request-to-send packet over a combined channel having at least two sub-channels, wherein a width of said combined channel is substantially equal to the width of said first channel.

20. The apparatus of claim 19, wherein said extended request-to-send packet comprises first and second duration fields.

21. The apparatus of claim 20, wherein said first duration field corresponds to a first time period at least partially overlapping a second time period for transmitting said first packet.

22. The apparatus of claim 21, wherein said first duration filed corresponds to the sum of at least a third time period for transmitting a first clear-to send packet over said combined channel, and a fourth time period for transmitting a second clear-to-send packet over said second channel.

23. The apparatus of claim 20, wherein said second duration field corresponds to a time period for transmitting said first packet.

24. The apparatus of claim 19, wherein said controller is able to control transmission of a clear-to-send packet over a combined channel having at least two sub-channels, wherein a width of said combined channel is substantially equal to the width of said first channel.

25. The apparatus of claim 19, wherein said controller is able to control transmission of a clear-to-send packet over said second channel.

26. The apparatus of claim 19, wherein said controller is able to control transmission of an extended request-to-send packet over said second channel.

27. The apparatus of claim 26, wherein said extended request-to-send packet comprises first and second duration fields.

28. The apparatus of claim 27, wherein said first duration field corresponds to a first time period at least partially overlapping a second time period for transmitting said first packet.

29. The apparatus of claim 28, wherein said first duration filed corresponds to the sum of at least a third time period for transmitting a first clear-to send packet over said combined channel, and a fourth time period for transmitting a second clear-to-send packet over said second channel.

30. The apparatus of claim 26, wherein said second duration field corresponds to a time period for transmitting said first packet.

31. The apparatus of claim 19, wherein said controller is able to force a collision of a packet transmitted over said second channel.

32. The apparatus of claim 19, wherein said first packet comprises a data packet.

33. The apparatus of claim 19, wherein said second packet comprises a protection packet.

34. A system comprising:
a communication device comprising:
a controller able to control transmission of a first packet over a first channel, which is wider than a second channel intended for receiving a second packet, wherein said first and second channels have substantially the same central frequency; and one or more omni-directional antennas able to transmit said first packet, wherein said controller is able to control transmission of an extended request-to-send packet over a combined channel having at least two sub-channels, wherein a width of said combined channel is substantially equal to the width of said first channel.

35. The system of claim 34 comprising another communication device able to receive said first packet.

36. The system of claim 34, wherein said controller is able to control transmission of a clear-to-send packet over a combined channel having at least two sub-channels, wherein a width of said combined channel is substantially equal to the width of said first channel.

37. The system of claim 34, wherein said controller is able to control transmission of a clear-to-send packet over said second channel.

38. The system of claim 34, wherein said controller is able to control transmission of an extended request-to-send packet over said second channel.

39. The system of claim 34, wherein said controller is able to force a collision of a packet transmitted over said second channel.

40. A computer readable storage medium having instructions readable by a computer that when executed by the computer result in:
transmitting a first packet over a first channel, which is wider than a second channel intended for receiving a second packet, wherein said first and second channels have substantially the same central frequency, the computer readable storage medium further comprising instructions resulting in transmitting an extended request-to-send packet over a combined channel having at least two sub-channels, wherein a width of said combined channel is substantially equal to the width of said first channel.

41. The computer readable storage medium of claim 40 further comprising instructions resulting in transmitting a clear-to-send packet over a combined channel having at least two sub-channels, wherein a width of said combined channel is substantially equal to the width of said first channel.

42. The computer readable storage medium of claim 40 further comprising instructions resulting in transmitting a clear-to-send packet over said second channel.

43. The computer readable storage medium of claim 40 further comprising instructions resulting in transmitting an extended request-to-send packet over said second channel.

44. The computer readable storage medium of claim 40 further comprising instructions resulting in forcing a collision of a packet transmitted over said second channel.

* * * * *